Aug. 26, 1969     T. ALBU     3,463,149
NOSE AIR FILTER
Filed July 5, 1968
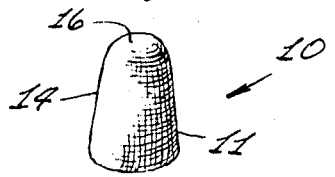
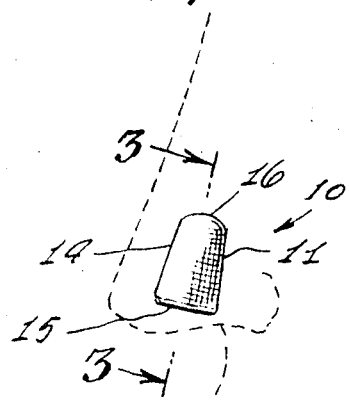
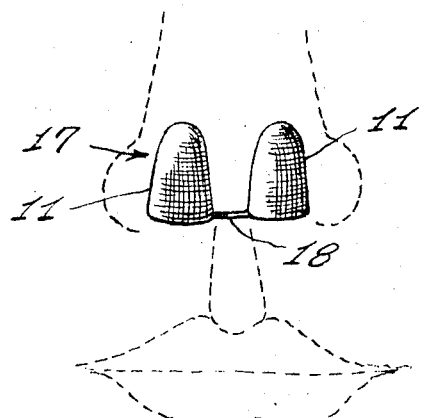
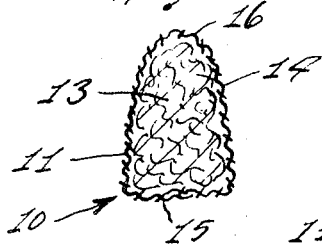
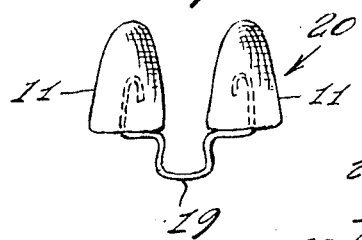
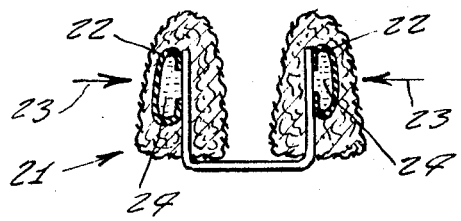
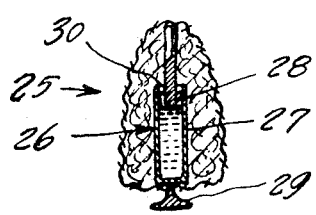
INVENTOR
THEODOR ALBU

United States Patent Office 3,463,149
Patented Aug. 26, 1969

3,463,149
NOSE AIR FILTER
Theodor Albu, 31024 Glenmuer Ave.,
Farmington, Mich. 48024
Filed July 5, 1968, Ser. No. 742,615
Int. Cl. A61f 15/00, 13/00; A61m 15/08
U.S. Cl. 128—140                    1 Claim

ABSTRACT OF THE DISCLOSURE

A filter plug removably receivable within each nostril of a person for the purpose of filtering out air impurities such as dust so to prevent entry thereof into the person's body, the device comprising a cotton body contained within a fabric covering. A medicament containing cylinder, having a stationary ported piston received therein, dispenses medicament into the body upon relative movement of the cylinder and piston.

---

This invention relates generally to breathing filter devices.

It is generally well known that in modern times, serious attention is being given to the pollution of air due principally to the increase of heavy industry and vehicular gasoline engines, which among other causes contribute to the rising respiratory ailments in today's population. The air principally near large industrial centers is laden with solid particles as well as adverse gaseous components. Additionally in certain industries, such as mining, the air contains great quantities of dust which when breathed over a long period of time, impair a miner's health. Other industries expose workers to harmful germs. Accordingly, there is a need for a means to prevent entry of such objectionable substances into a person's respiratory system.

Accordingly, it is a principal object of the present invention to provide a nose air filter for human use which can be readily fitted removably within each nostril and which will filter solid particles from passing into the body.

Another object is to provide a nose air filter which comprises an interconnected double nostril unit wherein each nostril filter will thus support the other from readily falling out from the nostril.

Yet another object is to provide a nose air filter having a self contained medication therein which can be selectively dispensed throughout the filter so to be absorbed into the breath air moving through the filter.

Other objects are to provide an air nose filter which is simple in design, inexpensive to manufacture, rugged in construction, easy to use and efficient in operation.

The and other objects will be readily evident upon a study of the following specification and the accompanying drawing wherein:

FIGURE 1 is a perspective view of the invention.

FIGURE 2 is a side elevation view thereof shown inserted into a person's nostril, FIGURE 3 is a cross sectional view taken on line 3—3 of FIGURE 2.

FIGURE 4 is a front view of a modified form of the invention comprising a double nostril unit, FIGURE 5 is a modified design thereof, FIGURE 6 is a cross sectional view thereof showing a further modified medication dispensing feature, and FIGURE 7 is a cross sectional view showing a modified construction thereof.

Referring now to the drawing in detail, and more particularly to FIGURES 1 to 3, the reference numeral 10 represents an air nose filter according to the present invention, wherein there is a plug member 11 that is insertable into the entrance of a person's each nostril, the member 11 being comprised of a cotton filler 13 enclosed within a porous, fabric covering 14. The member 11 has a slightly tapered side wall extending from a broad relatively flat base 15, the opposite end 16 of the member being rounded to allow easy insertion into the nostril.

In a modified construction shown in FIGURE 4, the device 17 is comprised of a pair of plug members 11 connected together in properly spaced apart relation by a thin bridge 18 comprised of metal or plastic wire having each end inserted within a lower broad end of a plug member. The bridge may extend straight therebetween as shown in FIGURE 4, or it may be centrally downwardly arched, as shown at 19 in FIGURE 5, so to form a modified double plug device 20 wherein the plugs may be inserted deeper into the nostrils so to be fully invisible.

In FIGURE 6, a modified double plug device 21 includes a flexible, plastic container 22 within each plug 11, each container being adjacent a leg of a stiff U-shaped bridge. Each container has a small slit, normally closed, which is opened upon squeezing external pressure, as indicated by the arrows 23, so to release medication 24 from within the container so to flow into the cotton filler and impregnate the same. Thus a person may selectively control the dispensing of medication for affecting breath air moving through the filter into the nostril.

In FIGURE 7 a further modified form thereof comprises a device 25 wherein the container 26 is a slidable cylinder 27 movable against a stationary piston 28; the cylinder having an externally extending button 29 at the base end of the plug, so to allow periodic plunging of the cylinder while it is in the nostril without the need to remove the same therefrom. A small opening 30 in the piston allows escape of medication.

It is to be noted that the nose air filter could be constructed also without a protective covering 14, as shown in the drawing, but wherein it could be comprised of plug members each simply comprised of a wad of cotton shaped to the configuration shown. Furthermore, such plug member could be absent of the medication or perfume suggested above. Furthermore, the particular shape and size suggested heretofore in the specification or drawing could be likewise modified, as preferred.

Having described my invention, what I claim as new and desire to secure by Letters Patent is:

1. In a nose air filter, the combination of a mass of cotton filler enclosed within a porous covering to form a porous case of elongated character and having an apex at an upper end, a cylinder within said porous case, a piston within said cylinder, a piston rod integral with said piston, said piston rod extending outwardly of one end of said cylinder, said outward piston rod being fitted within said apex of said porous case, said piston and piston rod being stationary relative to said porous case, a quantity of liquid medication within said cylinder below said piston, bleed means for movement of said medication outward of said cylinder when under pressure by said piston, a button on a lower end of said cylinder extending outwardly of said porous case for manual operation and said cylinder being slidably moveable against said stationary piston to force said medication outward of said cylinder.

(References on following page)

References Cited

UNITED STATES PATENTS

| | | | |
|---|---|---|---|
| 831,004 | 9/1906 | Jousset | 128—198 |
| 1,311,461 | 7/1919 | Reynard | 128—198 |
| 2,162,583 | 6/1939 | Kjellsson | 128—140 |
| 2,395,109 | 2/1946 | Fonda | 128—200 |
| 2,431,649 | 11/1947 | Moats | 128—200 |
| 2,620,795 | 12/1952 | Muhlethaler | 128—198 |
| 2,660,166 | 11/1953 | Coleman | 128—140 |

FOREIGN PATENTS

| | | |
|---|---|---|
| 1,351,537 | 12/1963 | France. |
| 367,279 | 2/1932 | Great Britain. |
| 588,117 | 5/1947 | Great Britain. |

RICHARD A. GAUDET, Primary Examiner

KYLE L. HOWELL, Assistant Examiner

U.S. Cl. X.R.

128—206